W. B. Burtnett,
Paint Brush.
No. 106,544. Patented Aug. 23, 1870.
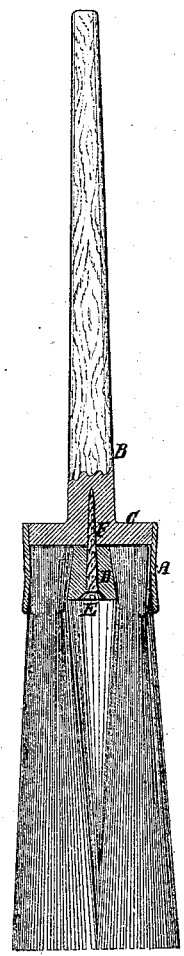
Witnesses.
Inventor.
W. B. Burtnett
per Munn & Co.
Attorneys.

United States Patent Office.

WILLIAM B. BURTNETT, OF NEW YORK, N. Y.

Letters Patent No. 106,544, dated August 23, 1870.

IMPROVED PAINT-BRUSH.

The Schedule referred to in these Letters Patent and making part of the same

*To all whom it may concern:*

Be it known that I, WILLIAM B. BURTNETT, of the city, county, and State of New York, have invented a new and useful Improvement in Paint-Brushes; and I do hereby declare that the following is a full, clear, and exact description thereof, which will enable others skilled in the art to make and use the same, reference being had to the accompanying drawing forming part of this specification.

This invention relates to improvements in attaching the bristles and handles together, and consists in securing a handle, having a disk on the end, of the size of the upper end of the ferrule, which is larger than the end receiving the bristles, by means of a screw or pin passing through a conical plug driven in at the center of the bristles, in the same way the handles are in the common construction of brushes, the said disks being also glued or cemented to the ferrules and the ends of the bristles, all as hereinafter described.

The drawing is a sectional elevation of a brush constructed according to my improvement.

A is the ferrule, preferably made of sheet metal, and larger at the end which receives the handle than at the other.

B is the handle, having a large disk, C, at the end, fitting the conical upper end of the ferrule.

The bristles are put into the smaller end of the ferrule, as shown, and wedged in by a conical wedge or plug, D, driven in at the center from the direction of the small ends of the bristles, in the same way that the handles of the common brushes are. This stretches the small end of the ferrule out wider than the central part.

After this plug is driven in, the small end, which projects beyond the bristles, is cut off, and the bristles are dressed off even with it and as low in the ferrule as it is required that the disk C shall enter; then a central hole is bored in the plug, for a screw, E, or it may be a conical pin, and the handle, previously provided with the disk, and the central hole, for the screw or pin, is inserted, and, besides being secured by the screw or pin, is glued or connected in any suitable or preferred way.

The screw is preferred to the pin, and by it the handle may be screwed in very tight, and the parts may be tightened up from time to time, in case they become loose by the shrinking of the plug D.

This method of fastening is preferable to the common way, for the handles are liable to work back in the direction from which they are driven in, which cannot be the case in this arrangement, where the conical plug, being held in its place by the handle, and the latter prevented from moving toward the plug by the conical ferrule, the whole is firmly and permanently united.

In case a pin is used in place of the screw E, a pin may be driven through the handle, and the said pin transversely above the disk C. This pin will, preferably, be made conical and driven through the plug D into the handle.

The upper ends of the bristles being the largest, pack into the space between the top of the plug and the uppermost part of the ferrule, so as to prevent the plug from drawing through and allowing the handle to escape that way. This is further prevented by the swelling or stretching of the ferrule from the small end toward the center, whereby the ferrule becomes the smallest thereat, preventing the plug from being drawn through by the handle, and the latter from being drawn through by the plug, and the two being locked together by the screw or pin, make a very permanent connection.

Having thus described my invention,

I claim as new, and desire to secure by Letters Patent—

The combination of the ferrule A, wooden-disked handle B C, plug D, and screw E, or a pin, all substantially as specified.

The above specification of my invention signed by me this 6th day of July, 1870.

WM. B. BURTNETT.

Witnesses:
GEO. W. MABEE,
L. S. MABEE.